US012576741B2

(12) United States Patent
Hao et al.

(10) Patent No.: US 12,576,741 B2
(45) Date of Patent: Mar. 17, 2026

(54) MULTI-PORT MULTI-BATTERY PACK CHARGING FOR VEHICLES

(71) Applicant: GM Global Technology Operations LLC, Detroit, MI (US)

(72) Inventors: Lei Hao, Troy, MI (US); Yue-Yun Wang, Troy, MI (US); Norman K. Bucknor, Troy, MI (US); Venkata Prasad Atluri, Novi, MI (US); Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 619 days.

(21) Appl. No.: 17/988,085

(22) Filed: Nov. 16, 2022

(65) Prior Publication Data

US 2024/0157832 A1 May 16, 2024

(51) Int. Cl.
B60L 53/62 (2019.01)
B60L 53/16 (2019.01)
H02J 7/00 (2006.01)

(52) U.S. Cl.
CPC .............. B60L 53/62 (2019.02); B60L 53/16 (2019.02); H02J 7/0018 (2013.01); H02J 7/0019 (2013.01); H02J 7/0024 (2013.01)

(58) Field of Classification Search
CPC .. B60L 53/62; B60L 53/16; B60L 6/52; B60L 11/1824; B60L 50/50; B60L 58/12; B60L 58/22; B60L 58/18; H02J 7/0018; H02J 7/0019; H02J 7/0024
USPC ........ 307/9.1, 10.1; 320/107, 109, 112, 124, 320/126, 128, 137, 138
See application file for complete search history.

(56) References Cited

U.S. PATENT DOCUMENTS

| | | | | |
|---|---|---|---|---|
| 5,644,209 A | * | 7/1997 | Chabbert | .............. H02J 7/0016 320/122 |
| 10,457,159 B1 | * | 10/2019 | Castelaz | ............. H02M 3/1582 |
| 11,180,179 B2 | | 11/2021 | Schultz et al. | |

(Continued)

FOREIGN PATENT DOCUMENTS

| | | | | |
|---|---|---|---|---|
| CN | 110914096 A | * | 3/2020 | ................ B60L 3/04 |

OTHER PUBLICATIONS

German Office Action for German Application No. 102023110507.8; dated Dec. 15, 2025; 9 pages.

*Primary Examiner* — Rexford N Barnie
(74) *Attorney, Agent, or Firm* — CANTOR COLBURN LLP

(57) ABSTRACT

Examples described herein provide a method that includes receiving, at a vehicle comprising a first battery pack and a second battery pack, at least one of a first electric charge from a first charging station via a first charging port or a second electric charge from a second charging station via a second charging port. The method further includes determining, by a controller of the vehicle, a charging mode of the vehicle. The charging mode is selected from a group consisting of a dynamic balancing during independent multi-port charging mode, a dynamic balancing during independent port charging mode, or a dynamic balancing during parallel charging mode. The method further includes configuring, by the controller of the vehicle, a plurality of switches of a rechargeable energy storage system of the vehicle based at least in part on the determined charging mode.

20 Claims, 3 Drawing Sheets

(56) References Cited

U.S. PATENT DOCUMENTS

| 11,336,101 | B2 | 5/2022 | Hao et al. | |
| 11,697,352 | B2 * | 7/2023 | Kusch | B60L 58/26 |
| | | | | 320/109 |
| 12,291,188 | B2 * | 5/2025 | Gesang | B60K 6/28 |
| 2011/0089760 | A1 * | 4/2011 | Castelaz | B60L 55/00 |
| | | | | 307/25 |
| 2020/0055404 | A1 * | 2/2020 | Conlon | B60L 53/14 |
| 2020/0391606 | A1 | 12/2020 | Noh | |
| 2021/0078429 | A1 * | 3/2021 | Li | B60L 58/21 |
| 2021/0078442 | A1 * | 3/2021 | Prasad | B60L 58/19 |

* cited by examiner

300

302

304

306

MULTI-PORT MULTI-BATTERY PACK CHARGING FOR VEHICLES

INTRODUCTION

Embodiments described herein generally relate to vehicles, and more specifically, to multi-port multi-battery pack charging for vehicles.

Modern vehicles (e.g., a car, a motorcycle, a boat, or any other type of automobile) may be equipped with one or more electric motors, such as to drive a wheel(s) of the vehicle. For example, an electric motor can be mechanically coupled to a wheel of a vehicle to apply rotational force to the wheel, creating a driveline. In some examples, a vehicle can include multiple electric motors. The electric motor(s) receives electric power from a rechargeable energy storage system (RESS), which can include one or more batteries for storing electric power. The batteries can be recharged, for example, using a charging port connected to a charging station. The RESS can also provide electric power to other systems of the vehicle (e.g., climate control systems, infotainment systems, etc.).

SUMMARY

In one exemplary embodiment, a method is provided. The method includes receiving, at a vehicle comprising a first battery pack and a second battery pack, at least one of a first electric charge from a first charging station via a first charging port or a second electric charge from a second charging station via a second charging port. The method further includes determining, by a controller of the vehicle, a charging mode of the vehicle. The charging mode is selected from a group consisting of a dynamic balancing during independent multi-port charging mode, a dynamic balancing during independent port charging mode, or a dynamic balancing during parallel charging mode. The method further includes configuring, by the controller of the vehicle, a plurality of switches of a rechargeable energy storage system of the vehicle based at least in part on the determined charging mode.

In addition to one or more of the features described herein, or as an alternative, further embodiments of the method may include diagnosing a problem with a switch of the plurality of switches of the rechargeable energy storage system of the vehicle.

In addition to one or more of the features described herein, or as an alternative, further embodiments of the method may include that diagnosing the problem comprises determining whether the switch changed from open to closed based at least in part on a first measured voltage of the first battery pack, a second measured voltage of the second battery pack, a measured accessory load, and first and second pack currents.

In addition to one or more of the features described herein, or as an alternative, further embodiments of the method may include that diagnosing the problem comprises determining whether the switch changed from closed to open based at least in part on a first measured voltage of the first battery pack, a second measured voltage of the second battery pack, a measured accessory load, and first and second pack currents.

In addition to one or more of the features described herein, or as an alternative, further embodiments of the method may include, responsive to diagnosing the problem with the switch of the plurality of switches of the rechargeable energy storage system of the vehicle, configuring at least one other switch of the plurality of switches of the rechargeable energy storage system of the vehicle to connect an auxiliary device generating an accessory load to one of the first battery pack or the second battery pack based at least in part on a first charge level of the first battery pack and a second charge level of the second battery pack.

In addition to one or more of the features described herein, or as an alternative, further embodiments of the method may include that the rechargeable energy storage system includes: a first switch electrically connected to the first charging port; a second switch electrically connected to the second charging port; a third switch electrically connected between the first switch and the second switch; a fourth switch electrically connected between the first battery pack and an auxiliary device generating an accessory load; and a fifth switch electrically connected between the second battery pack and the auxiliary device generating the accessory load.

In addition to one or more of the features described herein, or as an alternative, further embodiments of the method may include that the controller balances the accessory load of the auxiliary device between the first battery pack and the second battery pack by selectively opening the fourth switch and closing the fifth switch for a first period of time and selectively opening the fifth switch and closing the fourth switch for a second period of time.

In addition to one or more of the features described herein, or as an alternative, further embodiments of the method may include that the controller balances the accessory load of the auxiliary device between the first battery pack and the second battery pack based at least in part on a first charge of the first battery pack and a second charge of the second battery pack.

In addition to one or more of the features described herein, or as an alternative, further embodiments of the method may include that, during the dynamic balancing during parallel charging mode, the first switch, the second switch, and the third switch are closed, and wherein the controller selectively controls the fourth switch and the fifth switch based at least in part on a first current of the first battery pack and a second current of the second battery pack.

In another exemplary embodiment a vehicle is provided. The vehicle includes a first battery pack chargeable by at least one of a first charging port or a second charging port. The vehicle further includes a second battery pack chargeable by at least one of the first charging port or the second charging port. The vehicle further includes an auxiliary device generating an accessory load. The vehicle further includes a plurality of switches. The vehicle further includes a controller. The controller determines a charging mode of the vehicle. The charging mode is selected from a group consisting of a dynamic balancing during independent multi-port charging mode, a dynamic balancing during independent port charging mode, or a dynamic balancing during parallel charging mode. The controller further configures the plurality of switches based at least in part on the determined charging mode.

In addition to one or more of the features described herein, or as an alternative, further embodiments of the vehicle may include that the controller diagnoses a problem with a switch of the plurality of switches of the rechargeable energy storage system of the vehicle.

In addition to one or more of the features described herein, or as an alternative, further embodiments of the vehicle may include that diagnosing the problem comprises determining whether the switch changed from open to closed based at least in part on a first measured voltage of the first battery pack, a second measured voltage of the second battery pack, a measured accessory load, and first and second pack currents.

In addition to one or more of the features described herein, or as an alternative, further embodiments of the vehicle may include that diagnosing the problem comprises determining whether the switch changed from closed to open based at least in part on a first measured voltage of the first battery pack, a second measured voltage of the second battery pack, a measured accessory load, and first and second pack currents.

In addition to one or more of the features described herein, or as an alternative, further embodiments of the vehicle may include that the controller, responsive to diagnosing the problem with the switch of the plurality of switches of the rechargeable energy storage system of the vehicle, configures at least one other switch of the plurality of switches of the rechargeable energy storage system of the vehicle to connect an auxiliary device generating an accessory load to one of the first battery pack or the second battery pack based at least in part on a first charge level of the first battery pack and a second charge level of the second battery pack.

In addition to one or more of the features described herein, or as an alternative, further embodiments of the vehicle may include: a first switch electrically connected to the first charging port; a second switch electrically connected to the second charging port; a third switch electrically connected between the first switch and the second switch; a fourth switch electrically connected between the first battery pack and the auxiliary device generating the accessory load; and a fifth switch electrically connected between the second battery pack and the auxiliary device generating the accessory load.

In addition to one or more of the features described herein, or as an alternative, further embodiments of the vehicle may include that the controller balances the accessory load of the auxiliary device between the first battery pack and the second battery pack by selectively opening the fourth switch and closing the fifth switch for a first period of time and selectively opening the fifth switch and closing the fourth switch for a second period of time.

In addition to one or more of the features described herein, or as an alternative, further embodiments of the vehicle may include that the controller balances the accessory load of the auxiliary device between the first battery pack and the second battery pack based at least in part on a first charge of the first battery pack and a second charge of the second battery pack.

In addition to one or more of the features described herein, or as an alternative, further embodiments of the vehicle may include that, during the dynamic balancing during parallel charging mode, the first switch, the second switch, and the third switch are closed, and wherein the controller selectively controls the fourth switch and the fifth switch based at least in part on a first current of the first battery pack and a second current of the second battery pack.

In yet another exemplary embodiment a method is provided. The method includes determining, by a controller of a vehicle, a charging mode of the vehicle, wherein the charging mode is selected from a group consisting of a dynamic balancing during independent multi-port charging mode, a dynamic balancing during independent port charging mode, or a dynamic balancing during parallel charging mode. The vehicle includes a first battery pack and a second battery pack, wherein at least one of the first battery pack and the second battery pack are chargeable by at least one of a first charging station via a first charging port or a second charging station via a second charging port. The method further includes configuring, by the controller of the vehicle, a plurality of switches of a rechargeable energy storage system of the vehicle based at least in part on the determined charging mode. The method further includes diagnosing a problem with a switch of the plurality of switches of the rechargeable energy storage system of the vehicle. The method further includes, responsive to diagnosing the problem with the switch of the plurality of switches of the rechargeable energy storage system of the vehicle, configuring at least one other switch of the plurality of switches of the rechargeable energy storage system of the vehicle to connect an auxiliary device generating an accessory load to one of the first battery pack or the second battery pack based at least in part on a first charge level of the first battery pack and a second charge level of the second battery pack.

In addition to one or more of the features described herein, or as an alternative, further embodiments of the method may include that the rechargeable energy storage system includes: a first switch electrically connected to the first charging port; a second switch electrically connected to the second charging port; a third switch electrically connected between the first switch and the second switch; a fourth switch electrically connected between the first battery pack and the auxiliary device generating an accessory load; and a fifth switch electrically connected between the second battery pack and the auxiliary device generating the accessory load.

The above features and advantages, and other features and advantages, of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
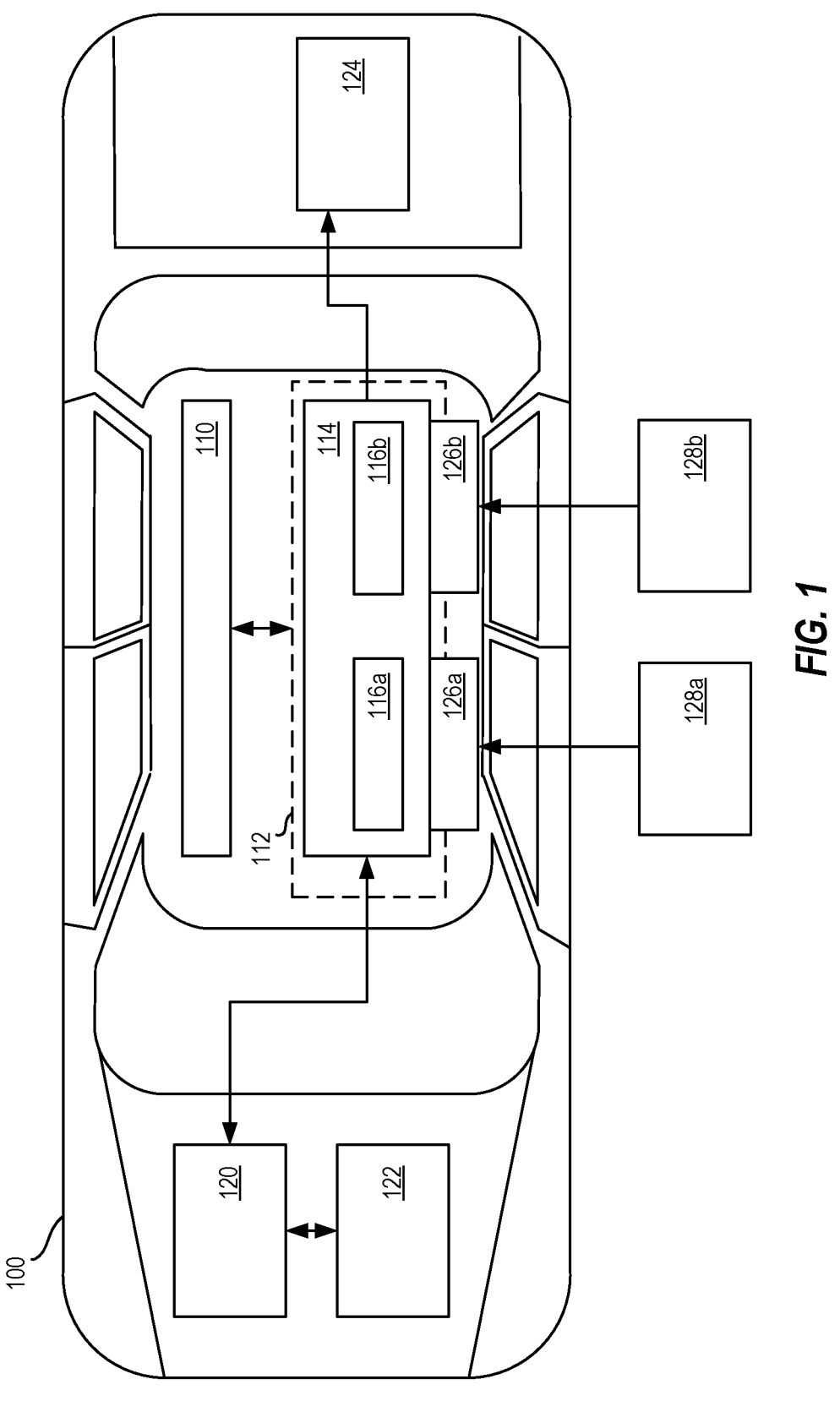
FIG. 1 depicts a block diagram of a vehicle having a rechargeable energy storage system according to one or more embodiments described herein.

The following description is merely exemplary in nature and is not intended to limit the present disclosure, its application or uses. It should be understood that throughout the drawings, corresponding reference numerals indicate like or corresponding parts and features.

FIG. 1 is a block diagram of a vehicle 100 having a rechargeable energy storage system (RESS) 114 according to one or more embodiments described herein. The vehicle 100 may be a car, truck, van, bus, motorcycle, boat, plane, or another suitable vehicle. In the example of FIG. 1, the vehicle 100 includes a controller 110 to control a circuit 112 that includes a rechargeable energy storage system (RESS) 114. The vehicle 100 further includes an electric motor 120 coupled to a driveline 122 and an auxiliary device 124. The auxiliary device 124 can include one or more devices, other than the electric motor 120, that receive electric power.

Examples of auxiliary devices, such as the auxiliary device 124, include but are not limited to a climate control system such as a heater and/or air conditioning system, RESS heater and air condition compressor, integrated power equipment, and/or the like, including combinations and/or multiples thereof.

The RESS 114 provides electric power to the electric motor 120 and the auxiliary device 124. As an example, the RESS 114 includes one or more batteries (e.g., pack 116a, pack 2 116b) to receive, store, and supply electric power. The controller 110 controls aspects of the circuit 112 (e.g., one or more relays (also referred to as "switches")) to selectively provide electric power to charge one or more packs 116a, 116b of the RESS 114 from a charging port or multiple charging ports. For example, the RESS 114 can receive power from a charging station 128a via charging port 126a and from a charging station 128b via charging port 126b to recharge the pack 116a and the pack 116b.

One or more embodiments described herein provide for multi-port multi-battery pack charging, such as for the pack 116a and the pack 2 116b, the RESS 114 being used to provide electric power to electric motors (e.g., the electric motor 120) used in automotive applications (e.g., for the vehicle 100). According to one or more embodiments described herein, the controller 110 provides dynamic charging balancing control for multiple battery packs (e.g., the pack 116a and the pack 116b) charged via multiple charging ports (e.g., the charging port 126a and the charging port 126b) while considering accessory load (e.g., load of the auxiliary device 124). In some cases, the charging ports 126a, 126b can provide independent charging to the packs (e.g., the pack 116a and the pack 116b). The controller 110 provides for dual pack charging balancing control and accessory (e.g., auxiliary device 124) load support if the packs are charged independently and packs are balanced, if the packs are charged independently and the packs are imbalanced, and/or if the packs are charged in parallel. The controller 110 can also provide for problem diagnosis and mitigation/correction for switch close/open faults according to one or more embodiments described herein.

Figure 2:
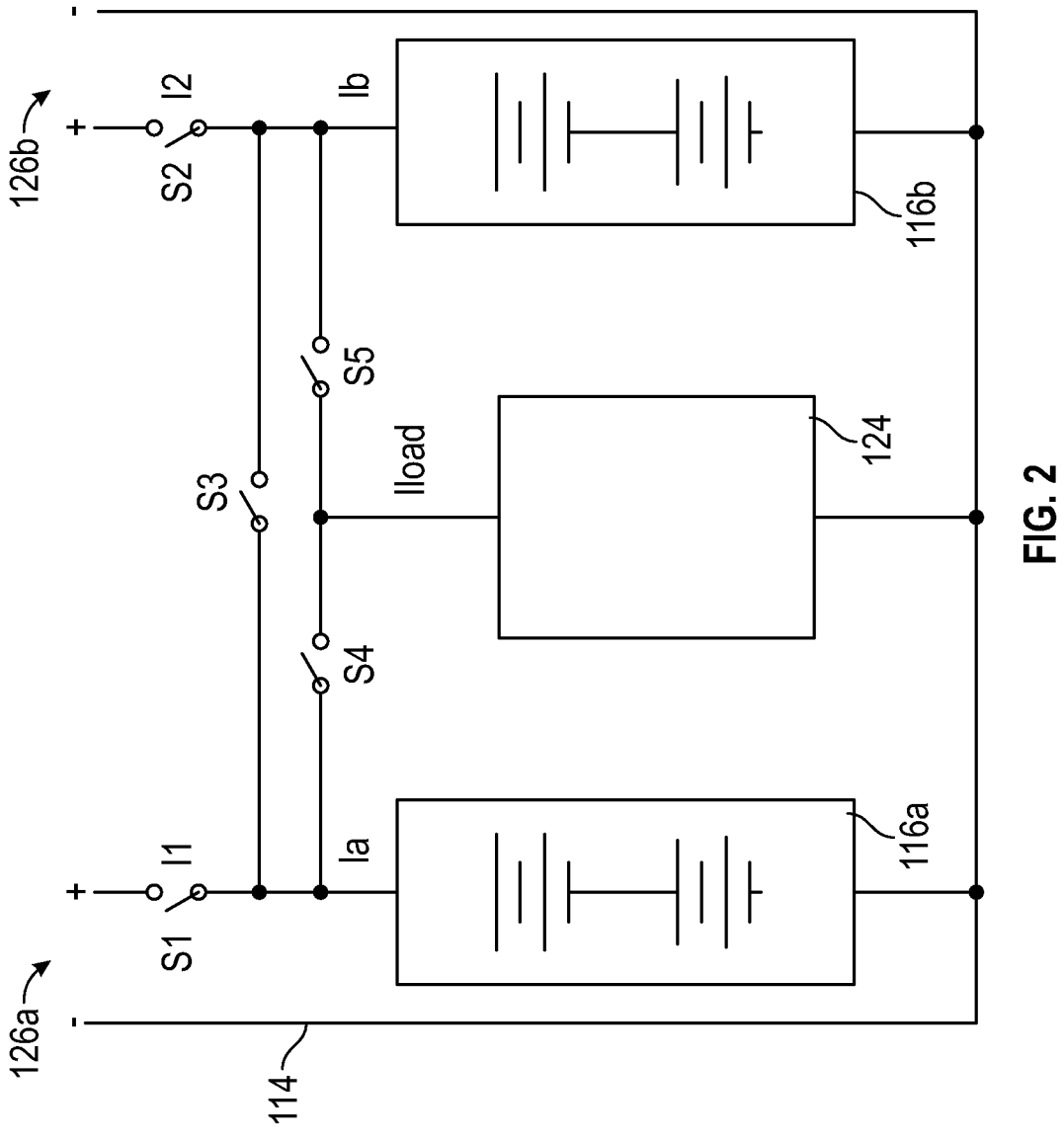
FIG. 2 depicts a block diagram of a circuit for multi-port multi-battery pack charging for vehicles according to one or more embodiments described herein.

One or more embodiments described herein improve the operation of vehicles, such as electric vehicles, by providing dynamic charging balancing control for multiple battery packs charged by multiple charging ports Turning now to FIG. 2, a circuit diagram of the circuit 112 of FIG. 1 for multi-port multi-battery pack charging for vehicles is shown according to one or more embodiments described herein.

The circuit 112 is now described according to an embodiment for dynamic balancing during independent multi-port charging (also referred to as "dynamic balancing during independent multi-port charging mode") with reference to FIG. 2. In this embodiment, independent multi-port charging occurs when both charging stations 128a, 128b are connected to the RESS 114 via the charging ports 126a, 126b and the switch S3 is open (switches S1 and S2 are closed). This arrangement supports accessory (e.g., auxiliary device 124) load and uses accessory load to dynamically balance between the two packs 116a, 116b during multi-port charging. In this scenario, initially switch S3 is open and switches S1 and S2 are closed. This provides for both packs 116a, 116b to be charged independently by the respective charging ports 126a, 126b. There are two scenarios for this mode.

First, if the packs 116a, 116b are balanced (e.g., have substantially equal loads), both of the charging ports 126a, 126b can provide the same currents. In this situation, the switches S4 and S5 alternate between closed and open for substantially equal periods of time (e.g., S4 is open for a first period of time while S5 is closed, then S4 is closed for a second period of time while S5 is open, where the first and second periods of time are substantially equal). This provides for supporting accessory loads and keeping the packs 116a, 116b balanced. Alternatively, S4 or S5 can be closed to connect the accessory load to the pack associated with the closed switch (e.g., if S4 is closed, the accessory (e.g., auxiliary device 124) load is associated with the pack 116a), where port currents I1 and I2 across S1 and S2 respectively are controlled. One example of such control is as follows: I1=Ia+Iload; I2=Ib OR I1=Ia; I2=Ib+Iload, where Ia+Ib are allowed battery pack charging current. Another example of such control is as follows. If a charge port current is limited and cannot provide sufficient power, then the controller 110 coordinates and controls charging current as follows: I1=Ilim=Ia+Iload; I2=Ib=Ia, where Ilim is a maximum charging port current.

Second, both charging stations 128a, 128b are still connected to the RESS 114 via the charging ports 126a, 126b and the switch S3 is open (switches S1 and S2 are closed) but in this scenario, packs 116a, 116b are imbalanced. In this case, the accessory load is switched to be connected to either pack 116a or pack 116b to balance the packs 116a, 116b. If pack 116a has a higher charge, switch S4 is closed and switch S5 is open to connect the accessory load to pack 116a and partially discharge pack 116a, where: I1=Ia+Iload; I2=Ib. If the charging port 126b can provide sufficient power, Ib is the battery pack charging current. Ia is controlled based on the state of charge (SoC) difference between the packs 116a, 116b. For example, Ia=Ib−α(SoC pack 116a−SoC pack 116b), where a is determined based on the remaining charge offset to a target charge level. If the current Ib of charging port 126b is limited to less than the battery pack allowed charging current, maximum charge pack currents are defined as Ib=Ilim; Ia=Ilim−Iload α(SoC pack 116a−Soc pack 116b). This operation takes turns depending on which pack (e.g., pack 116a or pack 116b) becomes stronger (e.g., has the larger store of power). When pack 116b becomes stronger, switch S4 is opened and switch S5 is closed to connect the accessory load to the pack 116b. The similar logic can be applied to balance the pack.

The circuit 112 is now described according to an embodiment for dynamic balancing during independent port charging (also referred to as "dynamic balancing during independent port charging mode") with reference to FIG. 2. In this embodiment, independent multi-port charging occurs when one of charging stations 128a, 128b are connected to the RESS 114 via the charging ports 126a, 126b and the switch S3 is closed (switches S1 and S2 are also closed). This arrangement supports accessory (e.g., auxiliary device 124) load and uses accessory load to dynamically balance between the two packs 116a, 116b during charging. This provides for both packs 116a, 116b to be charged by the one of respective charging ports 126a, 126b. If the packs 116a, 116b are balanced (e.g., have substantially equal loads), the switches S4 and S5 alternate between closed and open for substantially equal periods of time (e.g., S4 is open for a first period of time while S5 is closed, then S4 is closed for a second period of time while S5 is open, where the first and second periods of time are substantially equal). This provides for supporting accessory loads and keeping the packs 116a, 116b balanced. If packs 116a, 116b are imbalanced, accessory load is switched to be connected to either pack 116a or pack 116b to balance the packs 116a, 116b. If pack 116a has a higher charge, switch S4 is closed and switch S5 is open to connect the accessory load to pack 116a and partially discharge pack 116a, where: I1=Ia+Iload; I2=Ib. If the charging port 126a or port 126b can provide sufficient power for both battery pack, Ib is the battery pack charging current. Ia is controlled based on the state of charge (SoC) difference between the packs 116a, 116b. For example, Ia=Ib−α(SoC pack 116a–SoC pack 116b), where a is determined based on the remaining charge offset to a target charge level. If the current of charging port(Ilim) 126a or port 126b is limited to less than the battery pack allowed charging current, maximum charge pack currents are defined as Ib=Ilim/2; Ia=Ilim/2–Iload α(SoC pack 116a–Soc pack 116b). This operation takes turns depending on which pack (e.g., pack 116a or pack 116b) becomes stronger (e.g., has the larger store of power). When pack 116b becomes stronger, switch S4 is opened and switch S5 is closed to connect the accessory load to the pack 116b. The similar logic can be applied to balance the pack.

The circuit 112 now described according to an embodiment for dynamic balancing during parallel charging (also referred to as "dynamic balancing during parallel charging mode") with reference to FIG. 2. In this scenario, parallel charging is enabled by closing switch S3. For example, if the pack 116a and the pack 116b are in parallel (e.g., S3 closed), during multi-port charging, either S4 or S5 can be closed to assist the accessory load. In this example, switches S1, S2, and S3 are closed and both the pack 116a and the pack 116b are connected to different charge ports (e.g., the charging port 126a and the charging port 126b), where, I1+I2=Ia+Ib+Iload, Va=Vb=Vload, Va=Ia*Ra+Voca, and Vb=Ib*Rb+Vocb, where Voca and Vocb are pack 116a and pack 116b open circuit voltages respectively, Ra and Rb are pack 116a and pack 116b internal resistance, and Va and Vb are pack 116a and pack 116b terminal voltages.

It can be assumed that the accessory (e.g., auxiliary device 124) load is the current source and the port charge currents satisfy the following:

$$I_1 + I_2 = I_a \cdot \left(1 + \frac{R_a}{R_b}\right) + \frac{V_{oca} - V_{ocb}}{R_b} + I_{load} \qquad \text{(eq. 1)}$$

if the pack 116a allowed current<the pack 116b allowed current, and $$I_1 + I_2 = I_b \cdot \left(1 + \frac{R_b}{R_a}\right) + \frac{V_{ocb} - V_{oca}}{R_a} + I_{load} \qquad \text{(eq. 2)}$$

if the pack 116b allowed current<the pack 116a allowed current.

If a multi-charge port can provide sufficient current greater than the right side of equation 2. The charge port current is controlled to satisfy equation 2.

If a multi-charge port current is limited and less than the current of the right side of equation 2, the maximum charge port currents may be used to charge multi-packs.

The circuit 112 now described according to an embodiment for switch diagnosis according to one or more embodiments described herein. According to an embodiment, S3 is closed after charging is complete and opened during charging. The controller 110 can detect whether S3 is open or closed. In this example, it can be assumed that the charging ports 126a, 126b are disconnected and propulsion drive load is zero.

To detect S3 from close to open, the current and the voltage of both the packs 116a, 116b are measured. S3 is detected as being open if both pack voltages change from Va=Vb to Va≠Vb. Current flowing through S3 is from a certain value to zero, which can be detected by current sensors in packs 116a, 116b. For example, if S4 is closed and the accessory load is connected to the pack 116a, the current from the pack 116a is equal to Iload and the current from the pack 116b is equal to substantially zero.

To detect S3 from open to close, the current and the voltage of both the packs 116a, 116b are measured. S3 is detected as being closed if both pack voltages change from Va≠Vb to Va=Vb. Current flowing through S3 is from zero to a certain value. This can be detected by a current sensor in the packs 116a, 116b. For example, if S4 is closed and accessory load is connected to the pack 116a, the current from the pack 116a plus the current from the pack 116b is equal to Iload and the current flow through S3.

Switch S4 and S5 diagnosis can be performed similarly. Both battery pack and accessory load voltage and current can be measured, and based on the variation of current and voltage as described regarding S3, the open-to-close or close-to-open action can be detected.

The circuit 112 now described according to an embodiment for switch fault mitigation according to one or more embodiments described herein. If S3 cannot be closed after charging, the accessory load is connected to the pack 116a, 116b having a lower charge, and the pack 116a, 116b with the higher charge is used to provide power for propulsion (e.g., to the electric motor 120). If S3 cannot be opened for charging, one of the charging ports 126a, 126b is used to charge both packs 116a, 116b or the controller 110 can use parallel charging to balance charging across the packs 116a, 116b if both charging ports 126a, 126b are connected. If S4 or S5 cannot be close (e.g., S4 cannot be closed), S3 and the other of S4 or S5 (e.g., S5) are closed and the accessory (e.g., auxiliary device 124) is still supplied by both packs 116a, 116b. If S4 or S5 cannot be opened (e.g., S4 cannot be opened), the other of S4 or S5 (e.g., S5) is opened and the accessory load is still supported by both packs 116a, 116b.

Figure 3:
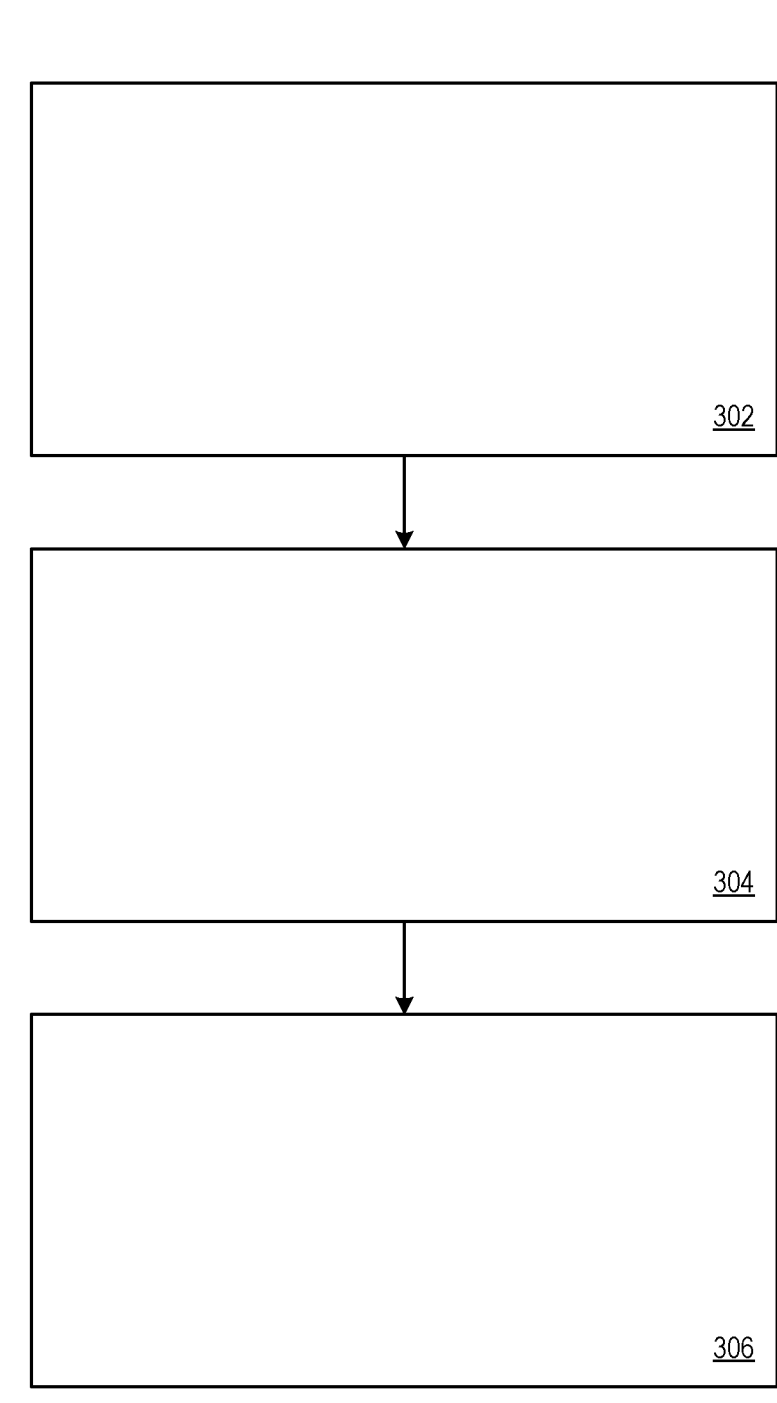
FIG. 3 depicts a flow diagram of a method for multi-port multi-battery pack charging for vehicles according to one or more embodiments described herein.

FIG. 3 depicts a flow diagram of a method 300 for multi-port multi-battery pack charging for vehicles according to one or more embodiments described herein. The method 300 can be performed by any suitable device and/or system, such as the controller 110 of the vehicle 100.

At block 302, the vehicle 100 receives at least one of a first electric charge from a first charging station (e.g., the charging station 128a) via a first charging port (e.g., the charging port 126a) or a second electric charge from a second charging station (e.g., the charging station 128b) via a second charging port (e.g., the charging port 126b).

At block 304, the controller 110 determines a charging mode of the vehicle 100. The charging mode is one of a dynamic balancing during independent multi-port charging mode, a dynamic balancing during independent port charging mode, or a dynamic balancing during parallel charging mode.

At block 306, the controller 110 configures a plurality of switches (e.g., one or more of switches S1-S5 of FIG. 2) of a rechargeable energy storage system (e.g., the RESS 114) of the vehicle based at least in part on the determined charging mode. According to one or more embodiments described herein, the rechargeable energy storage system includes a first switch (S1) electrically connected to the first charging port (e.g., the port 116a), a second switch (S2) electrically connected to the second charging port (e.g., the port 116b), a third switch (S3) electrically connected between the first switch (S1) and the second switch (S2), a fourth switch (S4) electrically connected between the first battery pack (e.g., the pack 116a) and an auxiliary device (e.g., the auxiliary device 124) generating an accessory load, and a fifth switch (S5) electrically connected between the second battery pack (e.g., the pack 116b) and the auxiliary device (e.g., the auxiliary device 124) generating the accessory load.

According to an embodiment, during the dynamic balancing during independent multi-port charging mode, the first switch (S1), the second switch (S2) are closed, and the third switch (S3) is open, and the controller 110 balances the accessory load of the auxiliary device between the first battery pack and the second battery pack by selectively opening the fourth switch (S4) and closing the fifth switch (S5) for a first period of time and selectively opening the fifth switch (S5) and closing the fourth switch (S4) for a second period of time.

According to one or more embodiments described herein, during the dynamic balancing during independent port charging mode, one of the first switch (S1) and the second switch (S2) are closed, and the third switch (S3) is closed, and the controller 110 balances the accessory load of the auxiliary device between the first battery pack and the second battery pack by selectively opening the fourth switch (S4) and closing the fifth switch (S5) for a first period of time and selectively opening the fifth switch (S5) and closing the fourth switch (S4) for a second period of time.

According to one or more embodiments described herein, during the dynamic balancing during parallel charging mode, first switch (S1), the second switch (S2), and the third switch (S3) are closed, and the controller 110 balances the accessory load of the auxiliary device between the first battery pack and the second battery pack based at least in part on a first charge of the first battery pack and a second charge of the second battery pack.

Additional processes also may be included. According to one or more embodiments described herein, the method 300 can include diagnosing a problem with a switch of the plurality of switches of the rechargeable energy storage system of the vehicle. As an example, diagnosing the problem includes determining whether the switch changed from open to closed based at least in part on a first measured voltage of the first battery pack and a second measured voltage of the second battery pack. As another example, diagnosing the problem includes determining whether the switch changed from closed to open based at least in part on a first measured voltage of the first battery pack and a second measured voltage of the second battery pack. According to one or more embodiments described herein, the method 300 can include, responsive to diagnosing the problem with the switch of the plurality of switches of the rechargeable energy storage system of the vehicle, configuring at least one other switch of the plurality of switches of the rechargeable energy storage system of the vehicle to connect an auxiliary device generating an accessory load to one of the first battery pack or the second battery pack based at least in part on a first charge level of the first battery pack and a second charge level of the second battery pack.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method comprising:
   receiving, at a vehicle comprising a first battery pack, a second battery pack, a first charging port, and a second charging port, at least one of a first electric charge from a first charging station via the first charging port or a second electric charge from a second charging station via the second charging port;
   determining, by a controller of the vehicle, a charging mode of the vehicle, wherein the charging mode is selected from a group consisting of a dynamic balancing during independent multi-port charging mode, a dynamic balancing during independent port charging mode, or a dynamic balancing during parallel charging mode;
   configuring, by the controller of the vehicle, a plurality of switches of a rechargeable energy storage system of the vehicle based at least in part on the determined charging mode; and
   diagnosing a problem with a switch of the plurality of switches of the rechargeable energy storage system of the vehicle, wherein diagnosing the problem comprises determining whether the switch changed from a first position to a second position based at least in part on a first measured voltage of the first battery pack, a second measured voltage of the second battery pack, a measured accessory load, and first and second pack currents.

2. The method of claim 1, wherein determining whether the switch changed from the first position to the second position comprises determining whether the switch changed from open to closed.

3. The method of claim 1, wherein determining whether the switch changed from the first position to the second position comprises determining whether the switch changed from closed to open.

4. The method of claim 1, further comprising, responsive to diagnosing the problem with the switch of the plurality of switches of the rechargeable energy storage system of the vehicle, configuring at least one other switch of the plurality of switches of the rechargeable energy storage system of the vehicle to connect an auxiliary device generating an accessory load to one of the first battery pack or the second battery pack based at least in part on a first charge level of the first battery pack and a second charge level of the second battery pack.

5. The method of claim 1, wherein the rechargeable energy storage system comprises:

a first switch electrically connected to the first charging port;

a second switch electrically connected to the second charging port;

a third switch electrically connected between the first switch and the second switch;

a fourth switch electrically connected between the first battery pack and an auxiliary device generating an accessory load; and a fifth switch electrically connected between the second battery pack and the auxiliary device generating the accessory load.

6. The method of claim 5, wherein the controller balances the accessory load of the auxiliary device between the first battery pack and the second battery pack by selectively opening the fourth switch and closing the fifth switch for a first period of time and selectively opening the fifth switch and closing the fourth switch for a second period of time.

7. The method of claim 5, wherein the controller balances the accessory load of the auxiliary device between the first battery pack and the second battery pack based at least in part on a first charge of the first battery pack and a second charge of the second battery pack.

8. The method of claim 5, wherein, during the dynamic balancing during parallel charging mode, the first switch, the second switch, and the third switch are closed, and wherein the controller selectively controls the fourth switch and the fifth switch based at least in part on a first current of the first battery pack and a second current of the second battery pack.

9. A vehicle comprising:

a first battery pack chargeable by at least one of a first charging port or a second charging port;

a second battery pack chargeable by at least one of the first charging port or the second charging port;

an auxiliary device generating an accessory load;

a plurality of switches comprising:

a first switch electrically connected to the first charging port;

a second switch electrically connected to the second charging port;

a third switch electrically connected between the first switch and the second switch;

a fourth switch electrically connected between the first battery pack and the auxiliary device generating the accessory load; and a fifth switch electrically connected between the second battery pack and the auxiliary device generating the accessory load; and a controller to:

determine a charging mode of the vehicle, wherein the charging mode is selected from a group consisting of a dynamic balancing during independent multi-port charging mode, a dynamic balancing during independent port charging mode, or a dynamic balancing during parallel charging mode; and configure the plurality of switches based at least in part on the determined charging mode, wherein the controller balances the accessory load of the auxiliary device between the first battery pack and the second battery pack by selectively opening the fourth switch and closing the fifth switch for a first period of time and selectively opening the fifth switch and closing the fourth switch for a second period of time.

10. The vehicle of claim 1, wherein the controller further diagnoses a problem with a switch of the plurality of switches of the rechargeable energy storage system of the vehicle.

11. The vehicle of claim 10, wherein diagnosing the problem comprises determining whether the switch changed from open to closed based at least in part on a first measured voltage of the first battery pack, a second measured voltage of the second battery pack, a measured accessory load, and first and second pack currents.

12. The vehicle of claim 10, wherein diagnosing the problem comprises determining whether the switch changed from closed to open based at least in part on a first measured voltage of the first battery pack, a second measured voltage of the second battery pack, a measured accessory load, and first and second pack currents.

13. The vehicle of claim 10, wherein the controller further, responsive to diagnosing the problem with the switch of the plurality of switches of the rechargeable energy storage system of the vehicle, configures at least one other switch of the plurality of switches of the rechargeable energy storage system of the vehicle to connect an auxiliary device generating an accessory load to one of the first battery pack or the second battery pack based at least in part on a first charge level of the first battery pack and a second charge level of the second battery pack.

14. The vehicle of claim 10, wherein the controller balances the accessory load of the auxiliary device between the first battery pack and the second battery pack based at least in part on a first charge of the first battery pack and a second charge of the second battery pack.

15. The vehicle of claim 10, wherein, during the dynamic balancing during parallel charging mode, the first switch, the second switch, and the third switch are closed, and wherein the controller selectively controls the fourth switch and the fifth switch based at least in part on a first current of the first battery pack and a second current of the second battery pack.

16. A method comprising:

determining, by a controller of a vehicle, a charging mode of the vehicle, wherein the charging mode is selected from a group consisting of a dynamic balancing during independent multi-port charging mode, a dynamic balancing during independent port charging mode, or a dynamic balancing during parallel charging mode, wherein the vehicle comprises a first battery pack and a second battery pack, wherein at least one of the first battery pack and the second battery pack are chargeable by at least one of a first charging station via a first charging port or a second charging station via a second charging port;

configuring, by the controller of the vehicle, a plurality of switches of a rechargeable energy storage system of the vehicle based at least in part on the determined charging mode, wherein the plurality of switches comprise:

a first switch electrically connected to the first charging port;

a second switch electrically connected to the second charging port;

a third switch electrically connected between the first switch and the second switch;

a fourth switch electrically connected between the first battery pack and an auxiliary device generating an accessory load; and a fifth switch electrically connected between the second battery pack and the auxiliary device generating the accessory load;

diagnosing a problem with a switch of the plurality of switches of the rechargeable energy storage system of the vehicle, wherein, during the dynamic balancing during parallel charging mode, the first switch, the second switch, and the third switch are closed, and wherein the controller selectively controls the fourth switch and the fifth switch based at least in part on a first current of the first battery pack and a second current of the second battery pack.

17. The method of claim 16, wherein diagnosing the problem comprises determining whether the switch changed from a first position to a second position based at least in part on a first measured voltage of the first battery pack, a second measured voltage of the second battery pack, a measured accessory load, and first and second pack currents.

18. The method of claim 17, wherein determining whether the switch changed from the first position to the second position comprises determining whether the switch changed from open to closed.

19. The method of claim 17, wherein determining whether the switch changed from the first position to the second position comprises determining whether the switch changed from closed to open.

20. The method of claim 16, further comprising, responsive to diagnosing the problem with the switch of the plurality of switches of the rechargeable energy storage system of the vehicle, configuring at least one other switch of the plurality of switches of the rechargeable energy storage system of the vehicle to connect the auxiliary device generating an accessory load to one of the first battery pack or the second battery pack based at least in part on a first charge level of the first battery pack and a second charge level of the second battery pack.

* * * * *